US009710326B2

(12) United States Patent
Zhang et al.

(10) Patent No.: US 9,710,326 B2
(45) Date of Patent: Jul. 18, 2017

(54) ENCODER BY-PASS WITH SCRAMBLER (71) Applicant: SK Hynix Inc., Gyeonggi-do (KR)

(72) Inventors: Fan Zhang, Fremont, CA (US);
Chung-Li Wang, Fremont, CA (US);
Chun Hok Ho, Foster City, CA (US)

(73) Assignee: SK Hynix Inc., Gyeonggi-do (KR)

( * ) Notice: Subject to any disclaimer, the term of this patent is extended or adjusted under 35 U.S.C. 154(b) by 21 days.

(21) Appl. No.: 14/721,888

(22) Filed: May 26, 2015

(65) Prior Publication Data

US 2016/0026526 A1 Jan. 28, 2016

Related U.S. Application Data (60) Provisional application No. 62/029,860, filed on Jul. 28, 2014.

(51) Int. Cl.
G11C 29/00 (2006.01)
H03M 13/00 (2006.01)
G06F 11/10 (2006.01)
G06F 21/79 (2013.01)
G11C 29/04 (2006.01)

(52) U.S. Cl.
CPC ...... *G06F 11/1068* (2013.01); *G06F 11/1048* (2013.01); *G06F 21/79* (2013.01); *G11C 2029/0411* (2013.01)

(58) Field of Classification Search
CPC .. G06F 11/1068; G06F 11/1048; G06F 21/79; G11C 2029/0411
See application file for complete search history.

(56) References Cited

U.S. PATENT DOCUMENTS

| 8,631,304 | B2 | 1/2014 | Lasser |
| 8,677,123 | B1 | 3/2014 | McGregor, Jr. et al. |
| 8,769,191 | B2 | 7/2014 | Yun et al. |
| 8,832,539 | B1 | 9/2014 | Patil et al. |
| 2011/0239078 | A1* | 9/2011 | Luby ............... H04N 21/23106 |
| | | | 714/752 |

(Continued)

FOREIGN PATENT DOCUMENTS

| WO | 2007019220 | 2/2007 |
| WO | 2008019218 | 2/2008 |
| WO | 2009003038 | 12/2008 |

OTHER PUBLICATIONS

Office Action issued by the Taiwan Intellectual Property Office on Aug. 22, 2016.

(Continued)

*Primary Examiner* — Guy Lamarre
(74) *Attorney, Agent, or Firm* — IP & T Group LLP (57) ABSTRACT A first physical location is read to obtain read data. Error correction decoding is performed on the read data to obtain error-corrected data where the error-corrected data includes first error-corrected metadata. Error correction encoding is performed on a first random sequence combined with a second random sequence, concatenated with second metadata. Error correction encoding is also performed on a sequence of zeros concatenated with the first error-corrected metadata to obtain second encoded data. The error-corrected data, the first encoded data, and the second encoded data are summed to obtain migrated data, which is stored at a second physical location.

14 Claims, 5 Drawing Sheets (56) References Cited

U.S. PATENT DOCUMENTS

2012/0278687 A1* 11/2012 Sharon ............... G06F 11/1048
714/790
2013/0263201 A1  10/2013 Chung-How et al.
2014/0164694 A1  6/2014 Storer
2014/0281174 A1  9/2014 Lee

OTHER PUBLICATIONS

Patent Certificate and Publication of Granted Taiwanese Invention issued by the Taiwanese Intellectual Property Office on Feb. 11, 2017.

* cited by examiner

ENCODER BY-PASS WITH SCRAMBLER

CROSS REFERENCE TO OTHER APPLICATIONS

This application claims priority to U.S. Provisional Patent Application No. 62/029,860 entitled ENCODER BY-PASS WITH SCRAMBLER filed Jul. 28, 2014 which is incorporated herein by reference for all purposes.

BACKGROUND OF THE INVENTION

Some types of storage, such as solid state storage (e.g., NAND Flash), occasionally require migration of data from one physical location to another (e.g., without changing the associated logical address). In the case of solid state storage, additional voltage may be unintentionally added to a given location in storage when adjacent locations are read too many times. This causes the stored voltage level to increase and in some cases it may be increased to a voltage level where an incorrect bit value is read back. This is referred to as read disturb noise. Conversely, charge may leak out of solid state storage under certain conditions. For example, as the program and erase (P/E) count of a given location in solid state storage increases, the electrical insulation breaks down, causing that location to become "leaky." The stored voltage in a "leaky" location may drop to a level where an incorrect bit value is read back if the data is stored for too long of a time without being refreshed. For these reasons, data is periodically moved from one location to another in solid state storage in order to refresh the stored voltage to a proper level (e.g., neither too high nor too low).

Although techniques exist for migrating stored data from one physical location to another in an efficient manner (e.g., that reduces the amount of processing times and/or power consumed), such techniques are limited to storage systems that do not incorporate scrambling, or uses the same random bit sequence to scramble all of the data. It would be desirable if efficient techniques for migrating data could be developed for systems which include less restrictive scramblers (e.g., that scramble the data using different random bit sequences).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
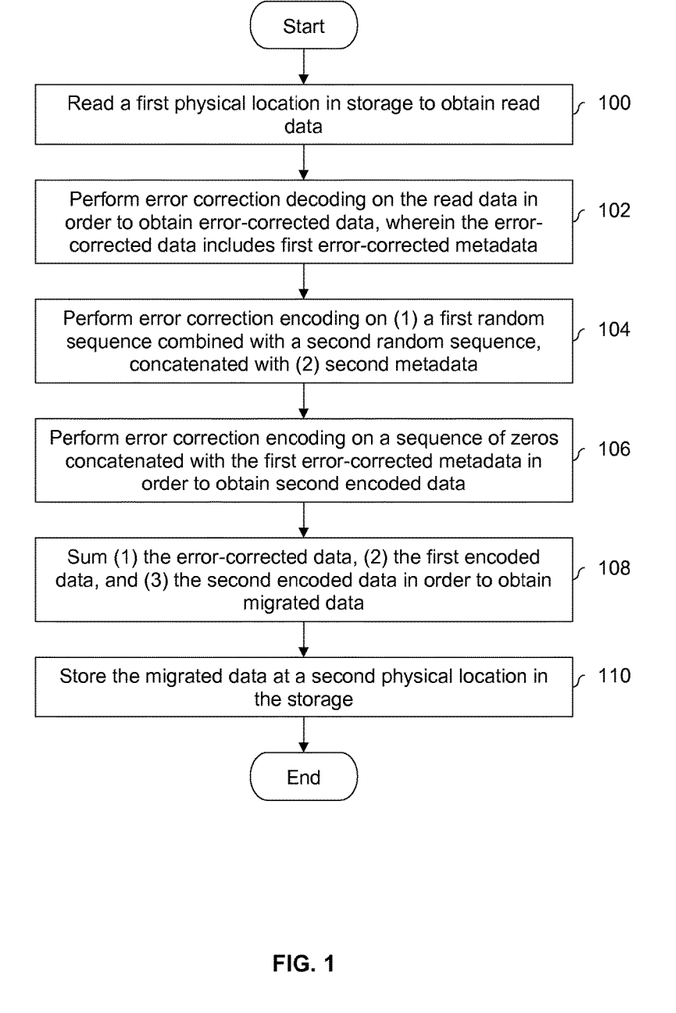
FIG. 1 is a flowchart illustrating an embodiment of a data migration process in a storage system that includes scramblers.

FIG. 1 is a flowchart illustrating an embodiment of a data migration process in a storage system that includes scramblers. In some embodiments, the process is performed by a storage controller. In some embodiments, the process is performed in a solid state storage system (e.g., a NAND Flash storage system).

At 100, a first physical location in storage is read to obtain read data. In examples described herein, the first physical location is sometimes referred to as an old physical location (i.e., the physical location from which data is migrated). In various embodiments, the read data comprises hard data (e.g., where only 0s and 1s are returned) or soft data (e.g., where in addition to a 1 or a 0 being returned, the likelihood or certainty in that bit value is also returned). As an example of the latter, in some embodiments the read data comprises log-likelihood ratio (LLR) values where the sign indicates the bit value (e.g., a positive value corresponds to a 0 and a negative value corresponds to a 1, or vice versa) and the magnitude indicates the likelihood or certainty in that value (e.g., a larger magnitude corresponds to a stronger likelihood or certainty).

In various embodiments, the first physical location in step 100 may be identified and/or the process of FIG. 1 may be initiated using a variety of detection techniques. For example, there may be a read disturb detection block in a storage controller that attempts to detection when too much read disturb noise has been added to a block. If the read disturb detection block believes too much read disturb noise has been added to a particular physical location, the process of FIG. 1 may be run on that physical location. Any appropriate read disturb detection technique may be used.

Similarly, in some embodiments the process of FIG. 1 is triggered for a particular physical location when the program and erase (P/E) count for a particular physical location reaches a certain threshold and/or that physical location has not been touched (e.g., programmed or erased) for a certain amount of time. Such conditions may cause the voltage level stored therein to drop to an undesirable level and it may be desirable to migrate the stored data to a new physical location.

At 102, error correction decoding is performed on the read data in order to obtain error-corrected data, wherein the error-corrected data includes first metadata. In some embodiments, the stored data is encoded using a BCH code or a low-density parity-check (LDPC) code and a corresponding decoder is used. Depending upon the type of read data (e.g., hard data versus soft data) a hard-input error correction decoder or a soft-input error detection decoder may be employed at step 102.

In one example of step 102, the read data may be conceptually thought of as:

$$\text{Read Data} = [u+s_1, m_1, p_1] + \text{Noise} \quad (1)$$

where u is the user or host data and $s_1$ is the first (pseudo) random sequence that was used to scramble the data (e.g., during the storage or write process). Naturally, the sequences u and $s_1$ have the same length or else the sequence u would not be completely or thoroughly scrambled by $s_1$. In some embodiments described herein, the random sequence used to scramble data (e.g., in this case, $s_1$) is dependent upon the physical location at which the data is to be stored. For example, a seed which is fed into a pseudo random number generator (PRNG) may depend upon the physical location at which the data is (to be) stored. This permits the pseudo random sequence be known (e.g., a priori), so long as the physical location of the data is known.

Returning to Equation (1), $m_1$ is first metadata (e.g., which may be used by the storage controller to store a variety of things and which is unrelated to this technique) and $p_1$ is first parity information (e.g., generated by the error correction encoder (after scrambling) during the write or storage process). The noise in Equation (1) is additive noise.

The resulting error-corrected data is (assuming the number of bit errors introduced by the noise is within the error correction capability of the code):

$$\text{Error Corrected Data} = [\widehat{u+s_1}, \widehat{m_1}, \widehat{p_1}]. \quad (2)$$

To clearly indicate that these versions are error correction versions, a "^" has been added to each.

At 104, error correction encoding is performed on (1) a first random sequence combined with a second random sequence, concatenated with (2) second metadata. In some embodiments, the first random sequence and the second random sequence are combined using an adder and/or using an exclusive OR (XOR) function.

The first random sequence referred to by step 104 is the (pseudo) random sequence used to scramble the stored data in Equation (1) (i.e., $s_1$). Correspondingly, the second random sequence referred to by step 104 is the new (pseudo) random sequence (i.e., $s_2$), for example the value of which may depend upon the new physical location. Note that the length of u, $s_1$, and $s_2$ are all the same. For generality, it is also assumed that there will be new metadata (i.e., $m_2$). Therefore, the sequence which is input to the error correction encoder this first time is:

$$1\text{st Encoder Input} = [s_1 + s_2, m_2]. \quad (3)$$

and the output this first time is:

$$1\text{st Encoder Output} = [s_1 + s_2, m_2, p_3]. \quad (4)$$

In some embodiments, error correction encoding is performed at step 104 while error correction decoding is performed at step 102 and/or the two steps begin concurrently or otherwise simultaneously. It is noted that the error correction encoding at step 104 is able to be performed while error correction decoding is performed at step 102 since none of the inputs to step 104 (i.e., $s_1$, $s_2$, and $m_2$) require the completion of step 102. To put it another way, $s_1$, $s_2$, and $m_2$ are all known ahead of time and error correction decoding does not need to complete in order for those values to be known (e.g., the first and second random sequences and the second metadata may be generated or otherwise calculated solely from the old logical address and/or the new physical address and thus the completion of error correction decoding is not required in order for step 104 to begin).

At 106, error correction encoding is performed on a sequence of zeros concatenated with the first error-corrected metadata in order to obtain second encoded data. Unlike step 104, step 106 requires the completion of step 102 since the version of the first metadata input to step 106 is the error-corrected version. Although the read data includes a version of the first metadata, that version may include errors and so step 106 uses the first metadata after error correction decoding is (successfully) completed. The input to the encoder this second time is:

$$2\text{nd Encoder Input} = [0, \widehat{m_1}] \quad (5)$$

where the sequence of zeros has the same length as u, $s_1$, and $s_2$. As before, to clearly indicate that the version of the second metadata input here is an error-corrected version, a "^" is shown in Equation (5). The output of the encoder this second time is:

$$2\text{nd Encoder Output} = [0, \widehat{m_1}, p_4] \quad (6)$$

As will be described in more detail below, the sequence of zeros permits the error correction encoding to be performed faster this second time at 106 compared to the first time at 104.

At 108, (1) the error-corrected data, (2) the first encoded data, and (3) the second encoded data are summed in order to obtain migrated data. To put it another way, the migrated data is obtained by summing (e.g., using an XOR) the outputs of the error correction decoder (i.e., step 102), the first output of the error correction encoder (i.e., step 104), and the second output of the error correction encoder (i.e., step 106). That is:

$$\text{Migrated Data} = [\widehat{u+s_1}, \widehat{m_1}, \widehat{p_1}] + [s_1+s_2, m_2, p_3] + [0, \widehat{m_1}, p_4]. \quad (7)$$

When two of the same bit sequences are summed together, they cancel each other out. Since error-corrected versions are assumed to be correct (i.e., $\hat{s}_1 = s_1$), Equation (7) after cancellation reduces to:

$$\text{Migrated Data} = [\hat{u}+s_2, m_2, p_2] \quad (8)$$

Note that because the error correction code used is linear, $p_2 = \widehat{p_1} + p_3 + p_4$. This is because if three input bit sequences (i.e., $[\widehat{u+s_1}, \widehat{m_1}]$, $[s_1+s_2, m_2]$, and $[0, \widehat{m_1}]$) are summed prior to encoding using a linear code, the single parity sequence generated (i.e., $p_2$) would be the same value as if each of the three input bit sequences were individually or separately encoded and the three resulting parity sequences (i.e., $\widehat{p_1}$, $p_3$, and $p_4$) were summed.

At 110, the migrated data is stored at a second physical location in the storage. A logical-to-physical mapping table may be updated with the new (i.e., second) physical location (e.g., so that the migrated data can be properly retrieved from its new physical location if a host issues a read instruction).

The following figures show an example of a storage system which may perform the process of FIG. 1. First, the components associated with storing the data in its original or initial physical location are described (e.g., in response to receiving a write instruction from a host). Then, the components associated with migrating the data from its old physical location to its new physical location are described.

Figure 2A:
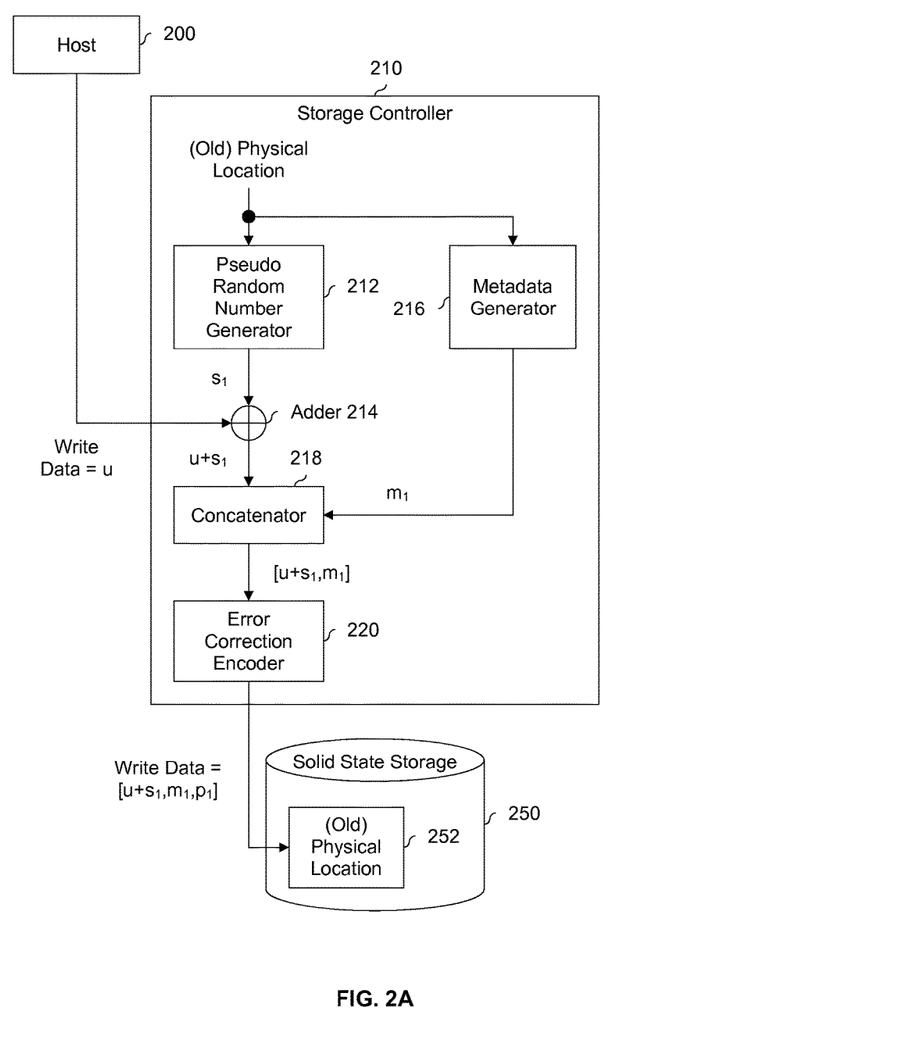
FIG. 2A is a diagram illustrating an embodiment of a storage system which stores data in response to a write instruction from a host.

FIG. 2A is a diagram illustrating an embodiment of a storage system which stores data in response to a write instruction from a host. In the example shown, the storage is solid state storage but naturally the techniques are applicable to other types of storage. In the example shown, host 200 issues a write instruction (not shown) to storage controller 210. In some embodiments, storage controller 210 is a semiconductor device, such as an application-specific integrated circuit (ASIC) or a field-programmable gate array (FPGA). To preserve readability, some components which are used when the data is migrated but which are not used when the data is initially stored are not shown in this figure.

A physical location (referred to in the next figure as an old physical location) is passed to pseudo random number generator (PRNG) 212. Any appropriate technique to select or pick the physical address may be employed and for brevity it is not described herein since it is not central to the techniques described herein. Using the physical location, PRNG 212 generates a first pseudo random sequence, $s_1$.

Adder 214 adds the first pseudo random sequence (i.e., $s_1$) and the write data (i.e., u) received from host 200. In some embodiments, adder 214 performs an exclusive OR (XOR) operation on the inputs.

The output of adder 214 (i.e., $u+s_1$) is passed to concatenator 218 which concatenates the output of adder 214 with the first metadata (i.e., $m_1$) generated by metadata generator 216. Metadata generator 216 (in this example at least) generates the metadata based on the physical location.

The output of concatenator 218 (i.e., $[u+s_1,m_1]$) is passed to error correction encoder 220. As described above, in some embodiments, error correction encoder 220 may be a BCH encoder or an LDPC encoder. The output of error correction encoder 220 (i.e., $[u+s_1,m_1,p_1]$) is stored to physical location 252 in solid state storage 250. As described above, physical location 252 will be referred to as the old physical location in the next figure.

In this example, the scrambler is an additive type of scrambler as opposed to a multiplicative type of scrambler. Additive scramblers have worse randomness compared to multiplicative scramblers when the length is short. However, this is typically not a concern for the lengths of data that storage systems typically deal with (e.g., 2K, 4K, etc.). And unlike multiplicative scramblers, additive scramblers can be implemented in parallel.

With this particular configuration (i.e., additive-type scrambling before error correction encoding), only the write data is scrambled, whereas the parity information generated by the error correction encoder is not scrambled. As such, the parity bits may have a worse balance between 0s and 1s compared to the write data bits. However, this may be acceptable for some applications when all tradeoffs are considered.

Figure 2B:
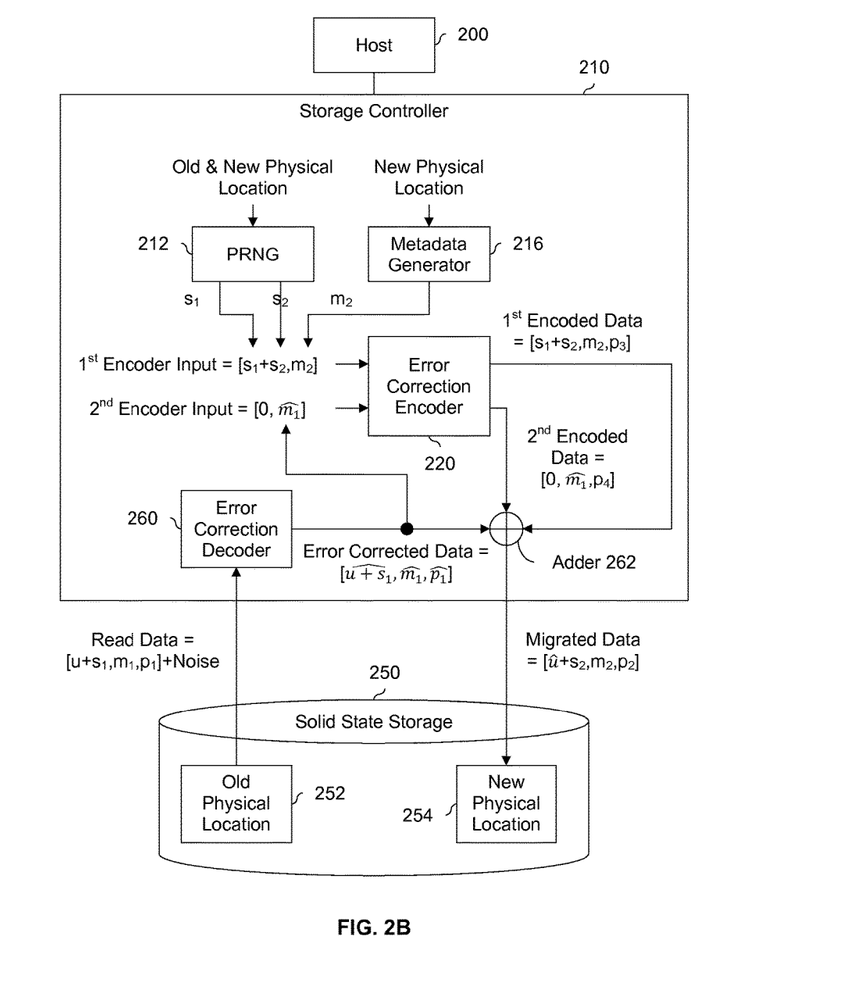
FIG. 2B is a diagram illustrating an embodiment of a storage system which migrates data.

The following figure shows components which perform the process of FIG. 1. To preserve readability, adder 214 and concatenator 218 are not shown in the following figure.

FIG. 2B is a diagram illustrating an embodiment of a storage system which migrates data. FIG. 2B shows the system shown in FIG. 2A at a later point in time with some components added and others removed due to space limitations. As described above, storage controller 210 may decide to migrate the data in old physical location 252 to new physical location 254 because of a variety of timers and/or events. Any appropriate technique may be used to decide that the data in old physical location 252 should be migrated and any appropriate technique may be used to pick the new physical location.

In the example shown, read data (see, e.g., Equation (1)) is obtained from old physical location 252 in solid state storage 250. In some embodiments, storage controller 210 includes a storage interface which reads from and writes to solid state storage 250. Due to space limitations, a storage interface is not shown in this figure. In some embodiments, if the read data comprises soft data, the storage interface reads old physical location 252 multiple times at multiple read thresholds in order to obtain the soft data. Such a storage interface is one example of a component within storage controller 210 which performs step 100 in FIG. 1.

The read data is passed from solid state storage 250 to error correction decoder 260 which produces error-corrected data. Note, for example, the "^" notations included in the output of error correction decoder 260 to indicate that they have been error correction decoded. Error correction decoder 260 is one example of a component which performs error correction decoding at step 102. As described above, in some embodiments error correction decoder 260 comprises one or more of the following: a soft-input error correction decoder, a BCH decoder, or an LDPC decoder.

While error correction decoder 260 is processing the read data, error correction encoder 220 processes the first encoder input (i.e., $[s_1+s_2,m_2]$) in order to produce the first encoded data (i.e., $[s_1+s_2,m_2,p_2]$). The random sequences $s_1$ and $s_2$ in the first encoder input come from pseudo random number generator 212 and are based (at least in this example) on the old physical location and the new physical location, respectively. The second metadata (i.e., $m_2$) from the first encoder input comes from metadata generator 216 and is based on the new physical location. As described above, adder 214 and concatenator 218 from FIG. 2A are not shown in FIG. 2B due to space limitations but they may be used to generate the first and second encoder inputs as needed.

Once the first input has been processed, error correction encoder 220 processes the second input (i.e., $[0, \widehat{m_1}]$) in order to produce second encoded data (see, e.g., Equation (6)). The error-corrected first metadata (i.e., $\widehat{m_1}$) from the second encoder input comes from the output of error correction decoder 260. In some embodiments, error correction encoder 220 bypasses the sequence of zeros at the beginning of the second encoder input (e.g., directly outputting a number of zeros that corresponds to the length of sequence of zeros in the second encoder input) and goes straight to processing the non-zero portion. This speeds up the processing time the second time around compared to the first. As described above, error correction encoder 220 is one example of a component which performs steps 104 and 106 from FIG. 1.

The error-corrected data from error correction decoder 260 and the first and second encoded data from error correction encoder 220 are summed by adder 262. Adder 262 is one example of a component which performs step 108 in FIG. 1.

The migrated data is then stored at new physical location 254 in solid state storage 250. As described above, a storage interface (not shown) in storage controller 210 may be the component to actually perform step 110 in FIG. 1 (e.g., by causing new physical location 254 to experience one or more program pulses as needed in order to program new physical location 254 with the migrated data).

Figure 3:
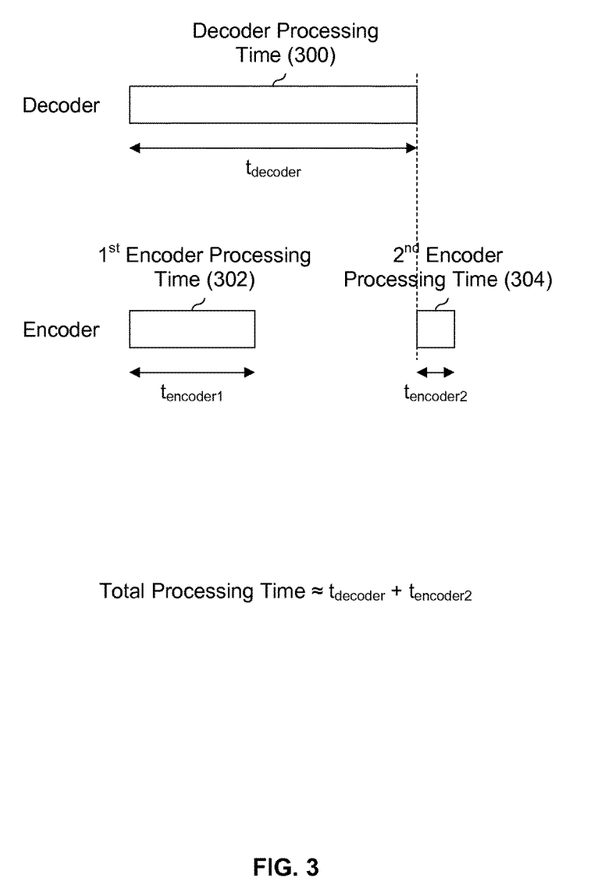
FIG. 3 is a timing diagram illustrating processing times associated with an error correction encoder and an error correction decoder during a data migration process.

The following figure shows a timing diagram example corresponding to some steps in FIG. 1. As will be described in more detail below, the timing diagram and related discussion below demonstrate why the process of FIG. 1 is faster compared to some other migration techniques.

FIG. 3 is a timing diagram illustrating processing times associated with an error correction encoder and an error correction decoder during a data migration process. In the example shown, the processing times shown are not necessarily to scale. Each of the lengths of times 300, 302, and 304 represents an amount of processing time spent performing some corresponding processing. Time 300 (i.e., $t_{decoder}$) is the amount of processing time spent by an error correction decoder performing error correction decoding on read data. In FIG. 1, this corresponds to the amount of processing time spent performing step 102.

To speed thing up, in this example it is assumed that error correction encoding at step 104 in FIG. 1 is performed while error correction decoding at step 102 is being performed. As such, the beginning of time 300 and 302 line up, where time 302 (i.e., $t_{encoder1}$) is the amount of processing time spent on a first encoding process. In FIG. 1, this corresponds to the amount of time spent performing step 104. Decoding typically takes longer to perform than encoding, and as such the lengths of times 300 and 302 are such that $t_{decoder} > t_{encoder1}$.

Since the input to the second encoding process depends upon the output of the decoding process, the beginning of time 304 (corresponding to the amount of processing time spent on a second encoding process) aligns with the end of time 300.

Time 304 (i.e., $t_{encoder2}$) is relatively short compared to $t_{encoder2}$ even though the lengths of the first encoder input and the second encoder input are the same because of the sequence of zeros in the second encoder input. Generally speaking, the error correction code is an (n,k) linear code over finite field F is denoted as C, where the code length is n and information length is k. C is the set of all length n vectors c ∈C such that cH=0, where H is the parity check matrix of C. In other words, C, as a linear subspace of $F^n$, is the null space of H. For any linear codes, the sum of two valid codeword is also a valid codeword. Any linear combination of valid codewords also gives a valid codeword. The encoding of C can be done by multiplying the input bit sequence (e.g., u) with the generator matrix G, which is a k by n matrix over F. One parity check matrix can be associated with multiple generator matrices. Encoding can be done by multiplying the information vector with any of the generator matrices. The intersection of two linear subspaces is also a linear subspace.

If only a small portion of the input bit sequence being encoded is non-zero (as is the case during the second encoding process due to the sequence of zeros), fast encoding can be performed either based on G (e.g., by skipping the zero portion) or based on H (e.g., by decoding with parity bits as erasures). In either case, the encoding computational complexity and latency are proportional to the length of non-zero portion of the input bit sequence (i.e., the length of $\hat{m}_1$)]. This permits $t_{encoder2}$ to be strictly less than $t_{encoder1}$, which is reflected in the lengths of times 302 and 304.

Thus, the total processing time is approximately $t_{decoder} + t_{encoder2}$, where $t_{encoder2}$ is shorter than a typical amount of time required to error correction encode a non-zero bit sequence (see, e.g., the length of $t_{encoder1}$). Some relatively small amounts of time, such as the amount of time to add the decoded data and the two pieces of encoded data together, are not included in the total processing time. Some other systems which perform data migration in a straightforward manner (e.g., reading the old physical location, error correction decoding the read data, scrambling the error-corrected user data, and then error correction encoding the scrambled data) would take longer since encoding a non-zero bit sequence will take longer than encoding a bit sequence that has many zeros. For example, instead of having something the length of $t_{encoder2}$ follow $t_{decoder}$, something the length of $t_{encoder1}$ would follow. The data migration techniques described above are therefore fast while still permitting a scrambler to be used.

Figure 4:
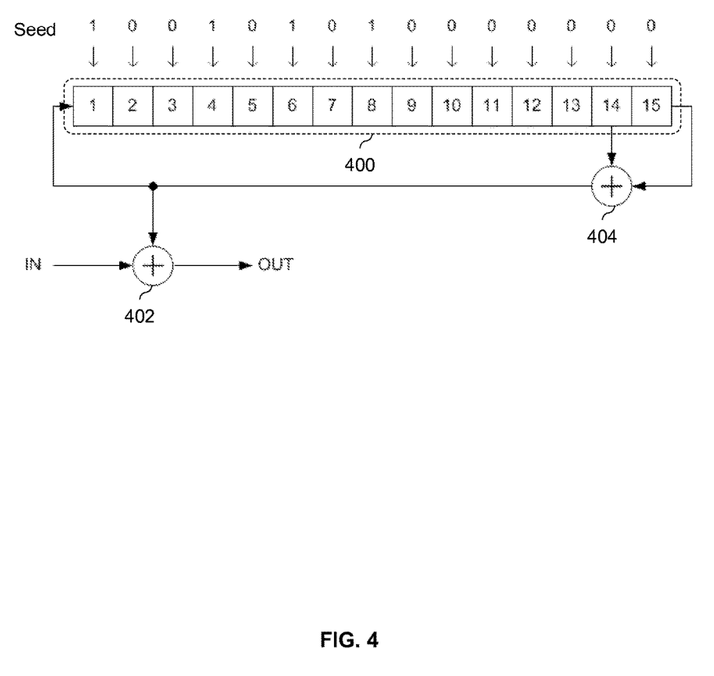
FIG. 4 is a diagram illustrating an embodiment of an additive type of scrambler.

FIG. 4 is a diagram illustrating an embodiment of an additive type of scrambler. In the example shown, the scrambler includes a chain of flip flops (400). A seed value (in this example, 100101010000000) is loaded into the chain of flip flops. Once the seed value is loaded, each of the flip flops in the chain passes its stored value to the next flip flop in the chain. The output of the $14^{th}$ register is combined with the output of the $15^{th}$ register using adder 404.

The output of adder 404 is passed to the beginning of chain 400, as well as adder 402. Adder 402 combines the input bit sequence (i.e., the thing being scrambled) with the output of adder 404 (i.e., the (pseudo) random bit sequence used to scramble the input bit sequence). The output of adder 402 is the scrambled bit sequence.

In comparing FIGS. 2A and 4, adder 402 corresponds to adder 214 and chain 400 and adder 404 collectively correspond to pseudo random number generator 212 (i.e., the output of adder 404 is a random number used to scramble the bit sequence that is input to the scrambler).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a storage; and
   a host issuing instructions to a storage interface for communicating with the storage, wherein
   the storage interface including an error correction decoder, an error correction encoder, and an adder, is configured to:
   read a first physical location in the storage to obtain read data; and
   store migrated data at a second physical location in the storage;
   the error correction decoder is configured to:
   perform error correction decoding on the read data in order to obtain error-corrected data, wherein the error-corrected data includes first error-corrected metadata;
   the error correction encoder is configured to:
   perform error correction encoding on (1) a first random sequence combined with a second random sequence, concatenated with (2) second metadata to obtain first encoded data; and
   perform error correction encoding on a sequence of zeros concatenated with the first error-corrected metadata in order to obtain second encoded data; and
   the adder is configured to sum (1) the error-corrected data, (2) the first encoded data, and (3) the second encoded data in order to obtain the migrated data.

2. The system of claim 1, wherein the system includes a semiconductor device, including one or more of the following: an application-specific integrated circuit (ASIC) or a field-programmable gate array (FPGA).

3. The system of claim 1, wherein error correction encoding is performed on (1) the first random sequence combined with the second random sequence, concatenated with (2) the second metadata while error correction decoding is performed on the read data.

4. The system of claim 1, wherein the storage includes solid state storage.

5. The system of claim 1, wherein the error correction encoder and the error correction decoder are configured to use one or more of the following codes: a BCH code or a low-density parity-check (LDPC) code.

6. A method, comprising:
reading a first physical location in storage to obtain read data;
using an error correction decoder to perform error correction decoding on the read data in order to obtain error-corrected data, wherein the error-corrected data includes first error-corrected metadata;
using an error correction encoder to:
perform error correction encoding on (1) a first random sequence combined with a second random sequence, concatenated with (2) second metadata to obtain first encoded data; and
perform error correction encoding on a sequence of zeros concatenated with the first error-corrected metadata in order to obtain second encoded data;
summing (1) the error-corrected data, (2) the first encoded data, and (3) the second encoded data in order to obtain migrated data; and
storing the migrated data at a second physical location in the storage.

7. The method of claim 6, wherein the method is performed by a semiconductor device, including one or more of the following: an application-specific integrated circuit (ASIC) or a field-programmable gate array (FPGA).

8. The method of claim 6, wherein error correction encoding is performed on (1) the first random sequence combined with the second random sequence, concatenated with (2) the second metadata while error correction decoding is performed on the read data.

9. The method of claim 6, wherein the storage includes solid state storage.

10. The method of claim 6, wherein performing error correction encoding and performing error correction decoding include using one or more of the following codes: a BCH code or a low-density parity-check (LDPC) code.

11. A computer program product, the computer program product being embodied in a non-transitory computer readable storage medium and comprising computer instructions, the computer instructions are executed by a processor and suitable for:
reading a first physical location in storage to obtain read data;
performing error correction decoding on the read data in order to obtain error-corrected data, wherein the error-corrected data includes first error-corrected metadata;
performing error correction encoding on (1) a first random sequence combined with a second random sequence, concatenated with (2) second metadata to obtain first encoded data;
performing error correction encoding on a sequence of zeros concatenated with the first error-corrected metadata in order to obtain second encoded data;
summing (1) the error-corrected data, (2) the first encoded data, and (3) the second encoded data in order to obtain migrated data; and
storing the migrated data at a second physical location in the storage.

12. The computer program product of claim 11, wherein error correction encoding is performed on (1) the first random sequence combined with the second random sequence, concatenated with (2) the second metadata while error correction decoding is performed on the read data.

13. The computer program product of claim 11, wherein the storage includes solid state storage.

14. The computer program product of claim 11, wherein the computer instructions for performing error correction encoding and performing error correction decoding include computer instructions for using one or more of the following codes: a BCH code or a low-density parity-check (LDPC) code.

* * * * *